(12) United States Patent
Beyse et al.

(10) Patent No.: US 7,589,948 B2
(45) Date of Patent: Sep. 15, 2009

(54) METHOD FOR ACTUATING AN ELECTROMAGNETIC VALVE

(75) Inventors: Thorsten Beyse, Schwieberdingen (DE); Markus Deeg, Eberdingen (DE)

(73) Assignee: Knorr-Bremse fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/181,147

(22) Filed: Jul. 28, 2008

(65) Prior Publication Data

US 2009/0026985 A1 Jan. 29, 2009

Related U.S. Application Data

(63) Continuation of application No. PCT/EP2007/000619, filed on Jan. 25, 2007.

(30) Foreign Application Priority Data

Jan. 26, 2006 (DE) .................. 10 2006 003 745

(51) Int. Cl.
*H01H 47/00* (2006.01)
(52) U.S. Cl. ....................................... 361/152
(58) Field of Classification Search .................. 361/152
See application file for complete search history.

(56) References Cited

U.S. PATENT DOCUMENTS

| 5,574,617 | A | * | 11/1996 | Shimanuki et al. ........... 361/154 |
|---|---|---|---|---|
| 5,645,097 | A | | 7/1997 | Zechmann et al. |
| 5,954,030 | A | * | 9/1999 | Sturman et al. .............. 123/446 |
| 6,017,017 | A | | 1/2000 | Lutz et al. |
| 6,216,652 | B1 | | 4/2001 | Gramann et al. |
| 6,722,628 | B1 | * | 4/2004 | Seil ........................ 251/129.15 |

FOREIGN PATENT DOCUMENTS

| DE | 42 05 563 A1 | 8/1993 |
|---|---|---|
| DE | 197 42 038 A1 | 3/1999 |
| DE | 199 14 593 C1 | 9/2000 |
| DE | 100 59 348 A1 | 6/2001 |
| EP | 0 933 274 A2 | 8/1999 |
| WO | WO 94/19810 A1 | 9/1994 |

OTHER PUBLICATIONS

International Search Report dated Mar. 27, 2007 w/English translation (six (6) pages).

* cited by examiner

*Primary Examiner*—Stephen W Jackson
(74) *Attorney, Agent, or Firm*—Crowell & Moring LLP

(57) ABSTRACT

A method for is provided actuating at least one electromagnetic valve containing at least one coil, which can be excited by an excitation current, and an armature, in which the excitation current can be set such that, in response to a signal for actuating the armature from one position into another position, it causes the actuator to move as a result of an excitation current threshold being exceeded, and is kept at a value which is lower by comparison in order to hold the armature in a specific position. The excitation current, which is greater than zero but below the excitation current threshold, is applied at least temporarily to the electromagnetic valve even if no signal for actuating or for holding the armature is present.

12 Claims, 1 Drawing Sheet

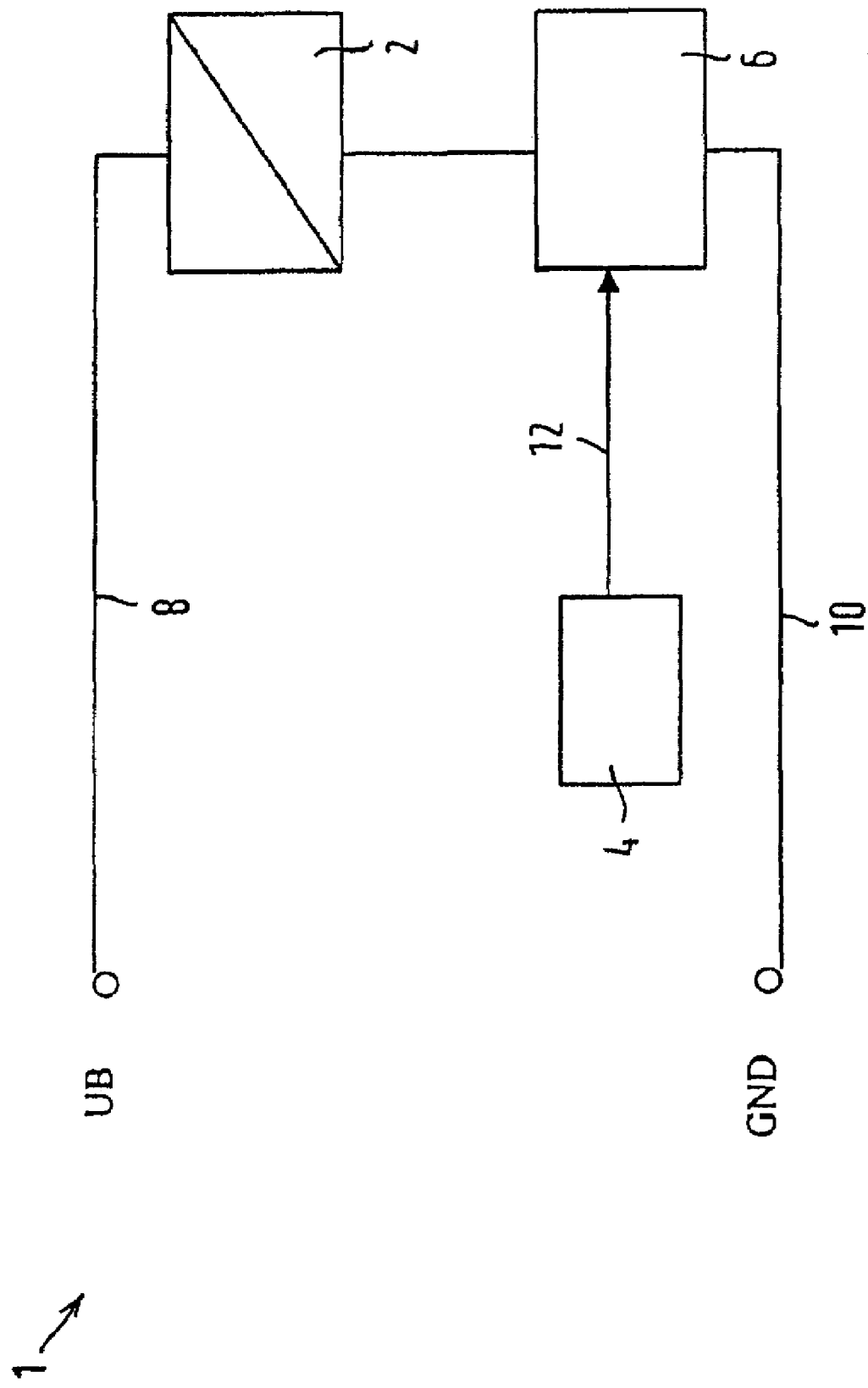

METHOD FOR ACTUATING AN ELECTROMAGNETIC VALVE

CROSS REFERENCE TO RELATED APPLICATIONS

This application is a continuation of PCT International Application No. PCT/EP2007/000619, filed Jan. 25, 2007, which claims priority under 35 U.S.C. § 119 to German Patent Application No. DE 10 2006 003 745.6, filed Jan. 26, 2006, the entire disclosures of which are herein expressly incorporated by reference.

BACKGROUND AND SUMMARY OF THE INVENTION

The invention is based on a method for actuating at least one electromagnetic valve containing at least one coil which can be excited by way of an excitation current, and an armature, wherein the excitation current can be set in such a manner that, in response to a signal for actuating the armature from one position into another position, it causes the armature to move as a result of an excitation current threshold being exceeded, and is kept at a value which is lower by comparison in order to hold the armature in a specific position.

A method according to the type in question is described, for example, in DE 197 42 038 A1 or in WO 94/19810 A.

Electromagnetic valves of this type may be switching valves or proportional valves. Electromagnetic switching valves, such as, for example, 2/2-way directional control valves or 3/2-way directional control valves, as used in antilock braking systems (ABS) or electronic braking systems (EBS) of vehicles, generally have an electromagnetic coil which can be excited by an exciting current. In order to switch said valves over from one switching position into another switching position in response to an actuating signal or a switching request which is controlled by an electronic control device, the exciting current has to exceed a certain exciting current threshold in order to be able to cause a corresponding movement of the armature. However, no switching over takes place at an exciting current below said exciting current threshold. In order then to hold the armature in its switching position counter to the action of a resetting spring, an exciting current lower than the exciting current switching threshold suffices.

In general, the current flowing through the coil of an electromagnetic valve of this type depends on the ambient temperature. Since, at low temperatures, the ohmic resistance of the coil is lower than at higher temperatures, the current flowing through the coil at low temperatures is greater than at higher temperatures.

Control devices which are formed from a plurality of such electromagnetic switching valves, in particular control devices of antilock braking systems (ABS), are known from the prior art. If a control device of this type is installed in a vehicle and the vehicle, for example when used in polar regions, is exposed to very low temperatures, on account of the ohmic resistance of the coils, which is very low, relatively high currents flow given a predetermined voltage, in particular if all of the solenoid valves of the control device are excited simultaneously. For example, 3.3 amps flow through the coil of an ABS solenoid valve at an ambient temperature of −40° C. These high currents may damage the electrical wiring of the control device and/or blow an electrical fuse.

EP 0 933 274 A2 discloses a hydraulic braking system with solenoid valves which control the flow of hydraulic fluid to and from brake actuators which are actuated by pressure medium. The hydraulic fluid is heated by means of the solenoid valves in order to reduce the viscosity of the fluid.

DE 100 59 348 A1 describes a method for actuating a braking device, in which valve coils necessary for hydraulic control functions are actuated for the purpose of electrically heating one or more supports holding said coils.

By contrast, the present invention is based on the object of further developing a method of the type mentioned at the beginning in such a manner that, even at very low temperature, the currents flowing through the coil of an electromagnetic valve are limited.

The invention is based on the concept of supplying an electromagnetic valve with an exciting current which is greater than zero but is below the exciting current threshold even if no request for actuating or for holding the armature is present. This is because the energizing of the coil generates heat in its turns, as a result of which its ohmic resistance rises, which in turn results in lower currents through the coil. The purpose of energizing the coil according to the invention consequently is to reduce the current through the coil for future requests for actuating or holding the armature.

If a plurality of such valves are combined in one constructional unit, for example in a control device, an advantageously low current loading of the electrical wiring arises even at very low ambient temperatures. In addition, the probability that a fuse will be blown is reduced. Owing to the fact that the exciting current supplied only for heating purposes is always below the exciting current threshold, an inadvertent switching over of the switching valve is avoided.

The exciting current is applied to the coil at a certain time interval after a holding phase of the armature is ended. It is then ensured that the armature is returned again into its initial switching position, and the holding phase is not affected by the heating current.

An exciting current below the exciting current threshold is particularly preferably applied to the coil as a function of the ambient temperature. Particularly if the ambient temperature drops below a lower threshold temperature, the coil is heated by the exciting current, but without causing a movement of the armature.

An actuation for heating purposes before a first functionally induced actuation is also highly advantageous if the temperature of the valve is equal to the ambient temperature. The energizing of the valve for heating purposes can be triggered, for example, by the ignition in a motor vehicle being switched on.

An exemplary embodiment of the invention is illustrated below in the drawing and explained in more detail in the description below.

BRIEF DESCRIPTION OF THE DRAWING

In the drawing, the single FIGURE shows an ABS control device of a motor vehicle with an electromagnetic switching valve which is controlled by a control method according to a preferred embodiment of the invention.

DETAILED DESCRIPTION OF THE DRAWING

Of a motor vehicle ABS control device, which is referred to overall by 1 in the FIGURE, only an electromagnetic switching valve, preferably a 2/2-way directional control solenoid valve 2, which can be switched between a passage position and a blocking position, a microcontroller 4 and end stage 6, preferably a low-side end stage, are shown for reasons concerned with clarity. The 2/2-way directional control solenoid valve 2 is representative of further solenoid valves installed in the control device 1.

The control device 1 is connected to a voltage source UB and ground GND via electric lines 8, 10. Furthermore, the microcontroller 4 actuates, via a signal line 12, the end stage 6 which, in turn, energizes or de-energizes at least one coil of the switching valve 2. Instead of an electromagnetic switching valve 2, a proportional valve, the armature of which can take up a plurality of positions as a function of the level of the current directed into it, could also be installed in the control device 1.

Furthermore, the 2/2-way directional control solenoid valve 2 contains in a known manner an armature (not shown) which, in response to a switching request, takes up a position, by the coil being energized with an exciting current above a certain exciting current switching threshold counter to the action of a resetting spring, in which position it, for example, closes a valve seat and consequently brings the valve 2 into a blocking position. In order to hold the armature in the blocking position, a current lower than the exciting current switching threshold is necessary. For example, the coil requires a current of 2.3 amps at room temperature in order to switch the valve 2 from the passage position into the blocking position. By contrast, in order to hold the armature in the blocking position, only 0.7 amp is required at room temperature.

When the coil is de-energized, the magnetic force acting on the armature is removed such that the armature is set back by the resetting spring into its initial position in which it opens up the valve seat and switches the valve into its passage position. Conversely, the 2/2-way directional control solenoid valve 2 could also be designed in such a manner that it switches into the passage position when energized and switches into the blocking position when de-energized. Solenoid valves 2 of this type are adequately known and therefore will not be discussed in further detail here.

According to a method for actuating the 2/2-way directional control solenoid valve 2, an exciting current which is greater than zero, but is below the exciting current switching threshold is applied, at least temporarily, to said valve even if no request for actuating or for holding the armature is present. In other words, end stage 6 assigned to the 2/2-way directional control solenoid valve is actuated by the microcontroller 4 in such a manner that the coil of the 2/2-way directional control solenoid valve 2 is supplied, at least temporarily, with a current which is greater than zero but is less than the exciting current switching threshold even if the valve 2 does not need to be switched over or holding in a switching position is required, said holding being brought about by energization. Care should therefore be taken to ensure that the current does not exceed the exciting current switching threshold and becomes sufficiently high that the 2/2-way directional control solenoid valve 2 is switched over.

This is because the coil of the solenoid valve 2 is energized solely for the purpose of generating heat in its turns, as a result of which its ohmic resistance rises, which in turn results in lower currents through the coil.

The ohmic resistance R of a coil as a function of the temperature T can be described by the following equation (1):

$$R(T) = R_{20} * [1 + \alpha(T-20)]$$

where $\alpha$: is the temperature coefficient of the electrical resistance,

T: is the temperature in ° C., $R_{20}$: is the ohmic resistance of the coil at 20° C.

If the control device 1 with the solenoid valve 2 is arranged in a motor vehicle standing in the open air, it can be assumed that the temperature T of the coil is approximately equal to the ambient temperature.

The energizing of the coil of the solenoid valve 2 below the exciting current switching threshold for the purpose of increasing the resistance takes place as a function of the temperature, preferably when the ambient temperature drops below a certain lower threshold temperature. If, for example, the coil is energized by an exciting current slightly below the exciting current switching threshold of approx. 2.4 amps, the temperature of the coil rises within approx. 240 seconds from an ambient temperature of −40° C. to 0° C. In the process, the resistance of the coil increases in accordance with the equation (1), as a result of which the current flowing through it drops.

An exciting (excitation) current below the exciting current switching threshold is particularly preferably applied to the coil at a certain time interval after a holding phase, during which the armature uses a relatively low current to hold the 2/2-way directional control solenoid valve 2, for example, in the blocking position, is ended. It is then ensured that the armature is returned again into its initial position by the action of the resetting spring, and the holding phase is not affected by the exciting current.

Within this context, the exciting current is applied to the coil for heating purposes preferably before a first functionally induced actuation, when the temperature of the valve is equal to the ambient temperature. The energizing of the coil for heating purposes can be triggered, for example, by the ignition in a motor vehicle being switched on.

The method according to the invention is not restricted to electromagnetic valves in braking systems of motor vehicles, but can be used for any electromagnetic valves which are exposed to low temperatures, for example for valves in transmission control systems, retarder control systems or engine control systems of vehicles.

Particularly preferably, electromagnetic valves which control a flow of pressure medium, such as pneumatic or hydraulic pressure medium, are controlled by means of the method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for actuating at least one electromagnetic valve containing at least one coil, which is excitable by way of an excitation current, and an armature, wherein the excitation current is settable such that, in response to a signal for actuating the armature from one position into another position, the excitation current causes the armature to move as a result of an excitation current threshold being exceeded, and is kept at a value which is lower by comparison in order to hold the armature in a specific position, the method comprising the acts of:

for reducing an ohmic resistance of the coil, applying an excitation current which is greater than zero but below the excitation current threshold, at least temporarily, to the electromagnetic valve even if no signal for actuating or for holding the armature is present; and wherein the excitation current is applied to the coil at a certain time interval after a holding phase of the armature is ended.

2. The method as claimed in claim 1, wherein an excitation current below the excitation current threshold is applied to the coil as a function of ambient temperature.

3. The method as claimed in claim 1, wherein an excitation current below the excitation current threshold is applied before a first functionally induced actuation of the electromagnetic valve, when the temperature of the electromagnetic valve is equal to an ambient temperature.

4. The method as claimed in claim 2, wherein an excitation current below the excitation current threshold is applied before a first functionally induced actuation of the electromagnetic valve, when the temperature of the electromagnetic valve is equal to an ambient temperature.

5. The method as claimed in claim 1, wherein an excitation current below the excitation current threshold is applied to the coil for a certain period of time.

6. The method as claimed in claim 2, wherein an excitation current below the excitation current threshold is applied to the coil for a certain period of time.

7. The method as claimed in claim 3, wherein an excitation current below the excitation current threshold is applied to the coil for a certain period of time.

8. The method as claimed in claim 4, wherein an excitation current below the excitation current threshold is applied to the coil for a certain period of time.

9. The method as claimed in claim 5, wherein the period of time is dependent on the ambient temperature.

10. The method as claimed in claim 5, wherein the period of time is dependent on the ambient temperature.

11. The method as claimed in claim 7, wherein the period of time is dependent on the ambient temperature.

12. The method as claimed in claim 8, wherein the period of time is dependent on the ambient temperature.

\* \* \* \* \*